US012625659B2

(12) United States Patent (10) Patent No.: US 12,625,659 B2
Fan et al. (45) Date of Patent: May 12, 2026

(54) DISPLAY METHOD AND DISPLAY SYSTEM OF VIDEO STREAMS

(71) Applicant: KONE Corporation, Helsinki (FI)

(72) Inventors: Jinquan Fan, Helsinki (FI); Martti Juurioksa, Helsinki (FI)

(73) Assignee: KONE CORPORATION, Helsinki (FI)

( * ) Notice: Subject to any disclaimer, the term of this patent is extended or adjusted under 35 U.S.C. 154(b) by 0 days.

(21) Appl. No.: 18/807,187

(22) Filed: Aug. 16, 2024

(65) Prior Publication Data

US 2025/0077153 A1 Mar. 6, 2025

(30) Foreign Application Priority Data

Aug. 29, 2023 (CN) .......................... 202311094957.2

(51) Int. Cl.
*G06F 3/14* (2006.01)
*G06V 20/52* (2022.01)
*H04N 7/18* (2006.01)

(52) U.S. Cl.
CPC ................ *G06F 3/14* (2013.01); *G06V 20/52* (2022.01); *H04N 7/181* (2013.01)

(58) Field of Classification Search
CPC .... B66B 25/006; B66B 29/005; H04N 7/181; G06F 3/14; G06V 20/52; G08B 13/19682
See application file for complete search history.

(56) References Cited

U.S. PATENT DOCUMENTS

2012/0206605 A1* 8/2012 Buehler ........... G08B 13/19693
348/159
2017/0043982 A1* 2/2017 Wang ....................... G01V 8/12

FOREIGN PATENT DOCUMENTS

| CN | 102055959 | A | * | 5/2011 | |
| CN | 110015600 | A | | 7/2019 | |
| CN | 113743211 | A | * | 12/2021 | ......... G06F 9/30076 |
| CN | 115801998 | A | | 3/2023 | |
| CN | 116416313 | A | | 7/2023 | |

OTHER PUBLICATIONS

Machine translation of CN 102055959 (Year: 2011).*
Chinese Office Action and Search Report for Chinese Application No. 202311094957.2, dated Mar. 10, 2026, with English translation.

* cited by examiner

*Primary Examiner* — Xuemei Zheng
(74) *Attorney, Agent, or Firm* — Birch, Stewart, Kolasch & Birch, LLP

(57) ABSTRACT

The present disclosure relates to a display method and a display system of video streams. The display method includes: obtaining a plurality of video streams associated with a plurality of video capture devices; determining a first plurality of video streams associated with a first escalator among the plurality of video streams; determining positions of a first plurality of video capture devices associated with the first plurality of video streams among the plurality of video capture devices over the first escalator; determining a first display order of the first plurality of video streams in a first plurality of display windows based on the determined positions of the first plurality of video capture devices over the first escalator; and displaying the first plurality of video streams in the first plurality of display windows according to the first display order.

20 Claims, 3 Drawing Sheets

200

600

DISPLAY METHOD AND DISPLAY SYSTEM OF VIDEO STREAMS

TECHNICAL FIELD

The present disclosure relates to a display method and a display system of video streams.

BACKGROUND

More and more video capture devices, such as webcams and cameras, are used to continuously capture video streams of a scene for monitoring purposes. Video streams of a scene captured by a video capture device may be viewed at a client device located at a remote location of the scene relative to the video capture device. A plurality of video streams captured by a plurality of video capture devices may be displayed in a plurality of display windows for a user to view.

SUMMARY

The present disclosure relates to a display method and a display system of video streams, which makes it possible to sequentially display the video streams in display windows according to a correspondence between the video streams and escalators, thereby facilitating a user to recognize the correspondence between the video streams and the escalators, improving the efficiency of monitoring of conditions on the escalators, and in turn helping service personnel to react quickly when an unexpected condition such as an accident occurs.

In accordance with an aspect of the present disclosure, a display method of video streams is provided. The display method comprises: obtaining a plurality of video streams associated with a plurality of video capture devices; determining a first plurality of video streams associated with a first escalator among the plurality of video streams; determining positions of a first plurality of video capture devices associated with the first plurality of video streams among the plurality of video capture devices over the first escalator; determining a first display order of the first plurality of video streams in a first plurality of display windows based on the determined positions of the first plurality of video capture devices over the first escalator; and displaying the first plurality of video streams in the first plurality of display windows according to the first display order.

In accordance with another aspect of the present disclosure, a display system of video streams is provided. The display system comprises a controller and a display. The controller is configured to: obtain a plurality of video streams associated with a plurality of video capture devices; determine a first plurality of video streams associated with a first escalator among the plurality of video streams; determine positions of a first plurality of video capture devices associated with the first plurality of video streams among the plurality of video capture devices over the first escalator; determine a first display order of the first plurality of video streams in a first plurality of display windows based on the determined positions of the first plurality of video capture devices over the first escalator; and control the display to display the first plurality of video streams in the first plurality of display windows according to the first display order.

According to the embodiments of the present disclosure, it is possible to sequentially display the video streams in display windows according to a correspondence between the video streams and escalators, thereby facilitating a user to recognize the correspondence between the video streams and the escalators, improving the efficiency of monitoring of conditions on the escalators, and in turn helping service personnel to react quickly when an unexpected condition such as an accident occurs.

BRIEF DESCRIPTION OF DRAWINGS

The aspects, features, and advantages of the present disclosure will become clearer and readily appreciated from the following description of embodiments taken in conjunction with the accompanying drawings, in which.

DETAILED DESCRIPTION

The detailed description of the present disclosure will be made below with reference to exemplary embodiments of the present disclosure. However, the present disclosure is not limited to the embodiments described herein, and it may be embodied in many different forms. The described embodiments are provided so that this disclosure will be thorough and complete, and will fully convey the concept of the disclosure to those skilled in the art. Features of the various embodiments described may be combined with or substituted for each other, unless explicitly excluded or should be excluded from the context.

Figure 1:
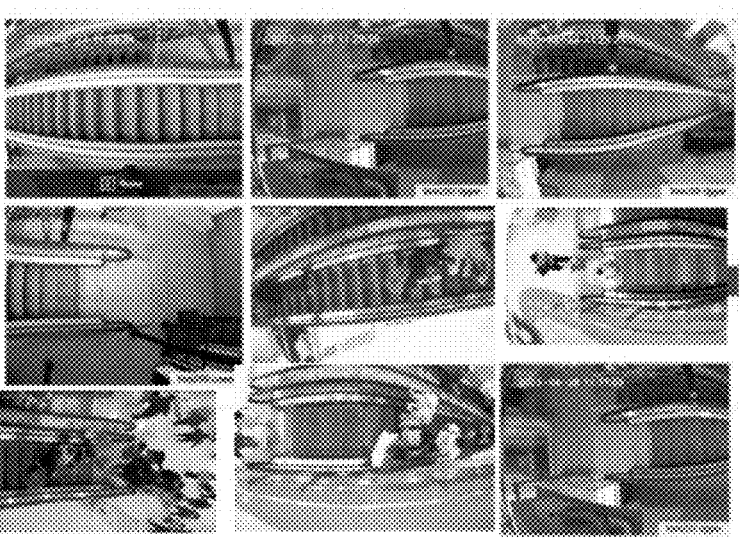
FIG. 1 illustrates how video streams are displayed in display windows at present.

As described above, a plurality of video streams captured by a plurality of video capture devices may be displayed in a plurality of display windows for a user to view. For example, video capture devices may be installed at different positions of an escalator to capture video streams associated with the escalator at corresponding positions. These video streams may be displayed to a user in display windows for purposes of monitoring or the like. FIG. 1 illustrates how video streams are displayed in display windows at present. As shown in FIG. 1, nine video streams associated with escalators are displayed in nine display windows. However, the display order of these video streams is random, or unordered. Based on the video streams displayed in FIG. 1, the user cannot determine which escalator each video stream is associated with, or which video streams are associated with the same escalator. Therefore, even if an unexpected condition such as an accident is found to occur on an escalator through viewing the video streams, the user or service personnel cannot quickly judge at which escalator or at which position of an escalator the unexpected condition occurs, and thus cannot quickly react.

The embodiments of the present disclosure propose a display method and a display system of video streams, which makes it possible to sequentially display video streams in display windows according to a correspondence between the video streams and escalators, thereby facilitating the user to identify which video stream corresponds to the same escalator, improving the efficiency of monitoring of conditions on the escalators, and in turn helping service personnel to react quickly when an unexpected condition such as an accident occurs.

Figure 2:
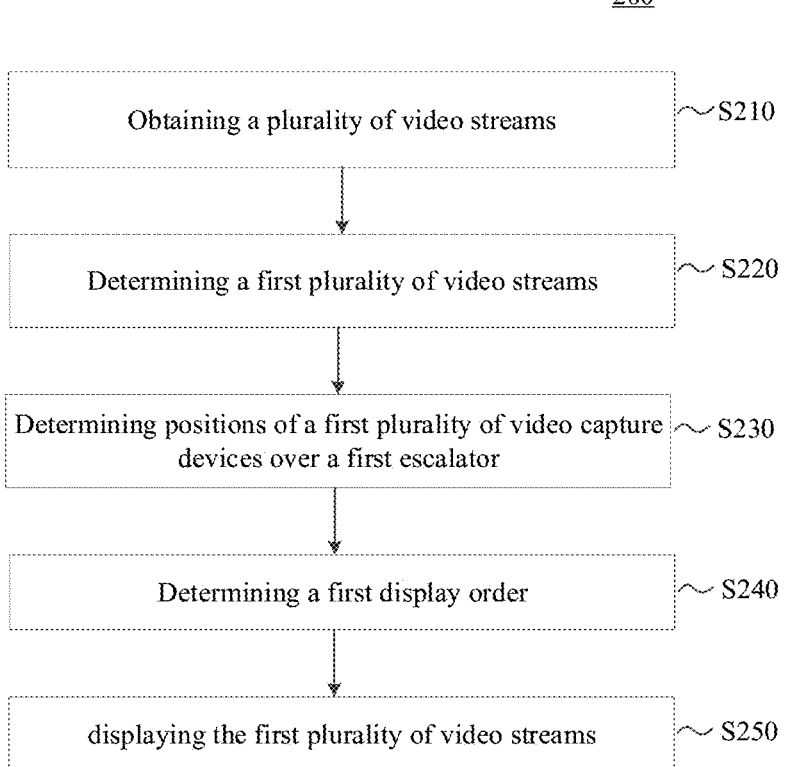
FIG. 2 is a flowchart of a displaying method of video streams according to an embodiment of the present disclosure.

FIG. 2 is a flowchart of a display method 200 of video streams according to an embodiment of the present disclosure. The display method 200 may be implemented by a display system including a controller and a display as described below with reference to FIG. 6. As shown in FIG. 2, the display method 200 of video streams may include steps S210-S250. At step S210, a plurality of video streams associated with a plurality of video capture devices may be obtained. A video capture device may be, for example, a webcam, camera, video recorder, or the like. The plurality of video capture devices may be respectively installed at different positions over the same escalator, or installed at various positions over different escalators. For example, the plurality of video capture devices may be respectively installed at positions over the upper landing, the lower landing, the middle upper portion, the middle lower portion, and the like of the same escalator, thereby capturing a plurality of video streams of the same escalator at these positions. As another example, the plurality of video capture devices may correspond to a plurality of positions over a plurality of escalators, thereby capturing a plurality of video streams of the plurality of escalators at the plurality of positions. Specifically, a first plurality of video capture devices of the plurality of video capture devices may correspond to a first escalator, and are respectively installed at positions over the upper landing, the upper portion, the middle upper portion, the middle portion, the middle lower portion, the lower portion, the lower landing, and the like of the first escalator, thereby capturing a plurality of video streams at these positions; a second plurality of video capture devices of the plurality of video capture devices may correspond to a second escalator, and are respectively installed at positions over the upper landing, the upper portion, the middle upper portion, the middle lower portion, the lower portion, the lower landing, and the like of the second escalator, thereby capturing a plurality of video streams at these positions; a third plurality of video capture devices of the plurality of video capture devices may correspond to a third escalator and are respectively installed at positions over the upper landing, the upper portion, the middle upper portion, the middle portion, the middle lower portion, the lower portion, the lower landing, and the like of the third escalator, thereby capturing a plurality of video streams at these positions, and so on. It can be appreciated that the different video capture devices associated with the different escalators are not necessarily corresponding to each other in terms of position and number. For example, the first plurality of video capture devices corresponding to the first escalator may be 3 in terms of number, and respectively installed at positions over the upper landing, the lower landing, and the middle portion of the first escalator. The second plurality of video capture devices corresponding to the second escalator may be 5 in terms of number, and respectively installed at positions over the upper landing, the lower landing, the upper portion, the middle upper portion and the lower portion of the second escalator.

Figure 3:
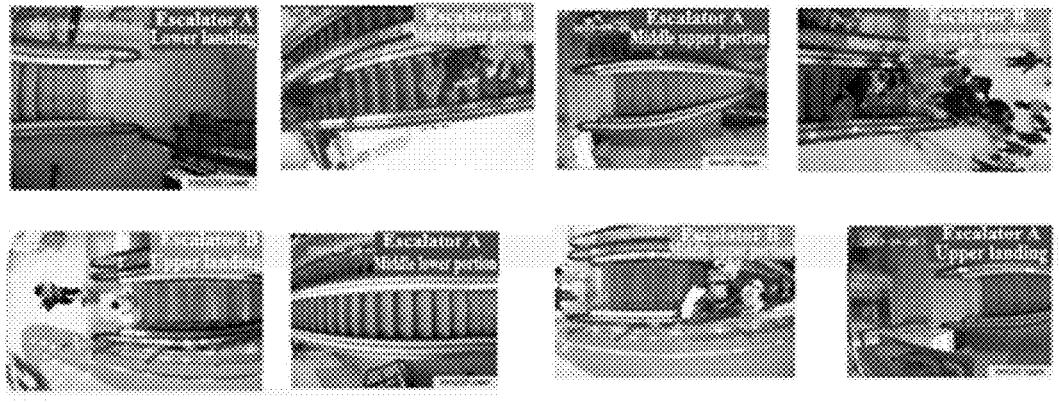
FIG. 3 illustrates schematic association relationships between video streams and escalators according to an embodiment of the present disclosure.

As described above, the plurality of video streams obtained at step S210 may be associated with different escalators. At step S220, a first plurality of video streams associated with the first escalator among the plurality of video streams may be determined. The first plurality of video streams may be video streams respectively captured by a first plurality of video capture devices. The controller performing the method 200 may predetermine the association of each video capture device with a respective escalator and the position of each video capture device over its associated escalator. For example, each video capture device may be tagged with its association with an escalator and its position when installed, and information regarding the association and the position may be communicated as input to the controller performing the method 200. The controller performing the method 200 may also determine which video stream is captured or transmitted by which video capture device. For example, a tag may be embedded in the video stream captured by each video capture device, indicating which video capture device the video stream is associated with, so as to facilitate the controller to determine the correspondence between the video stream and the video capture device that captures the video stream. Having determined the video capture device to which each video stream corresponds and the association of the video capture device with an escalator, it is possible to determine which escalator a particular video stream is associated with or which video streams are associated with a particular escalator. Accordingly, in one embodiment, step S220 may include determining the first plurality of video streams associated with the first escalator based on an association between the first plurality of video capture devices associated with the first plurality of video streams and the first escalator. FIG. 3 illustrates schematic association relationships between video streams and escalators according to an embodiment of the present disclosure. In the example of FIG. 3, it can be seen that 4 out of 8 video streams are associated with the first escalator (i.e., escalator A). The method 200 according to the present disclosure may determine, at step S220, a first plurality of video streams (in this example, 4 video streams) associated with a first escalator (in this example Escalator A) among the plurality of video streams (in this example, 8 video streams).

Referring back to FIG. 2, at step S230, positions of a first plurality of video capture devices associated with the first plurality of video streams among the plurality of video capture devices over the first escalator may be determined. As described above, the controller performing the method 200 may predetermine the association of each video capture device with a respective escalator and the position of each video capture device over its associated escalator, and may determine which video stream is captured or transmitted by which video capture device. Accordingly, after determining the first plurality of video streams associated with the first escalator at step S220, the controller performing the method 200 may further determine a first plurality of video capture devices associated with the first plurality of video streams, i.e., those video capture devices that capture or transmit the first plurality of video streams, and in turn determine the positions of the first plurality of video capture devices over the first escalator. As described above, the positions of the first plurality of video capture devices over the first escalator may, for example, include the positions over the upper landing, the upper portion, the upper middle portion, the middle portion, the lower middle portion, the lower portion, the lower landing, and the like of the first escalator. In the example of FIG. 3, positions of the first plurality of video capture devices associated with the determined first plurality of video streams over the first escalator are also further illustrated. As shown in FIG. 3, the positions of the first plurality of video capture devices associated with the first plurality of video streams (in this example, 4 video streams) over the first escalator (in this example, escalator A) are the lower landing, the upper middle portion, the lower middle portion, and the upper landing, respectively.

At step S240, a first display order of the first plurality of video streams in a first plurality of display windows may be determined based on the determined positions of the first plurality of video capture devices over the first escalator. In one embodiment, the first display order may be determined according to an order of positions of the first plurality of video capture devices over the first escalator. That is, step S240 may include determining the first display order based on a low-to-high position order or a high-to-low position order of the first plurality of video capture devices over the first escalator. Continuing with the example of FIG. 3, the positions of the first plurality of video capture devices associated with the first plurality of video streams over the first escalator (escalator A in this example) determined at step S230 are the lower landing, the upper middle portion, the lower middle portion, and the upper landing, respectively, and the first display order may be determined based on a low-to-high order of these positions (i.e., the lower landing, the lower middle portion, the upper middle portion, and the upper landing) or based on a high-to-low order of these positions (i.e., the upper landing, the upper middle portion, the lower middle portion, and the lower landing), such that the display of the first plurality of video streams according to the first display order determined in this way forms coherent and ordered video streams.

Figure 4:
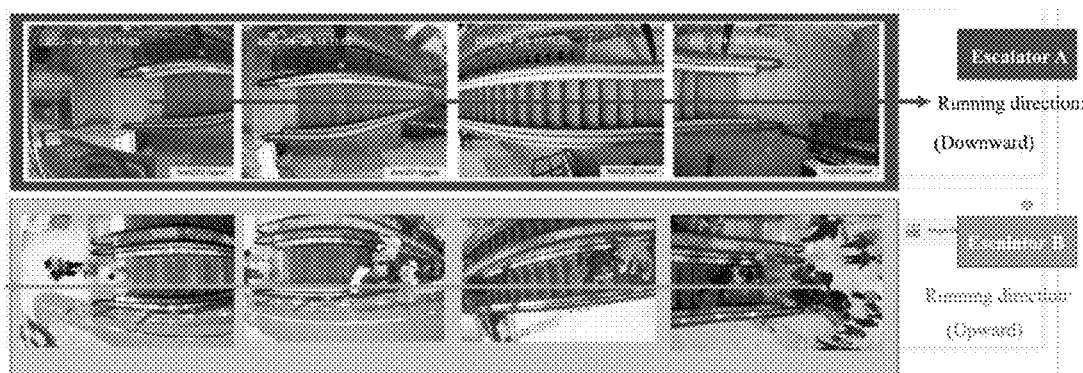
FIG. 4 schematically illustrates the display of video streams in display windows according to an embodiment of the present disclosure.

At step S250, the first plurality of video streams may be displayed in the first plurality of display windows according to the first display order. FIG. 4 schematically illustrates the display of video streams in display windows according to an embodiment of the present disclosure. In the example of FIG. 4, the first display order is determined based on a high-to-low order of positions of the first plurality of video capture devices over the first escalator, and the first plurality of (in this example, 4) video streams are displayed in the first plurality of (in this example, 4) display windows according to the first display order, as shown in the first row in the upper part of FIG. 4. As can be seen, the four video streams shown in the first row in the upper part of FIG. 4 correspond respectively to the four video streams associated with the first escalator (escalator A in this example) shown in FIG. 3. However, in contrast to the random and unordered video streams shown in FIG. 3, the video streams shown in FIG. 4 are coherent and ordered, and are associated with an escalator. As such, it can be convenient for the user or service personnel to monitor accidents and crowd conditions, easier to see events occurring in views of two video capture devices covering adjacent areas, and easier to recognize relationships between video streams and escalators, which can help the user or service personnel to improve the efficiency of monitoring, and to quickly react when an accident such as an automatic starting and a stopping of an escalator occurs.

The display of the video streams may also be associated with running directions of the escalators, so that the user or service personnel gets more information to facilitate monitoring and handling of the accident. Thus, in one embodiment, the method 200 may further include a step (not shown) of determining a running direction of the first escalator, which may occur, for example, after step S210, after step S220, after step S230, or after step S240. After determining the running direction of the first escalator, step S250 of method 200 may include a step (not shown) of identifying the running direction of the first escalator in the first plurality of display windows. The identification may be implemented, for example, using text, arrows, or the like. Referring to FIG. 4, it is further illustrated that the running direction of the first escalator is identified by an arrow in the first plurality of display windows as downward running.

The plurality of video streams may relate to more than one escalator, in which case the video streams associated with different escalators may be displayed in groups such that the user or service personnel may determine the correspondence between different video streams and different escalators. In one embodiment, operations similar to steps S220 to S250 described above may also be performed for video streams associated with a second escalator different from the first escalator, such that a coherent and ordered display of the video streams associated with the second escalator is also performed. Accordingly, the method 200 described above may also further include the following steps (not shown) of: determining a second plurality of video streams associated with a second escalator among the plurality of video streams; determining positions of a second plurality of video capture devices associated with the second plurality of video streams among the plurality of video capture devices over the second escalator; determining a second display order of the second plurality of video streams in a second plurality of display windows based on the determined positions of the second plurality of video capture devices over the second escalator; and displaying the second plurality of video streams in the second plurality of display windows according to the second display order. These steps are similar to steps S220 to S250 described above in connection with FIG. 2, and are not repeated here.

Reference is again made to FIGS. 3 and 4. It is shown in FIG. 3 that 4 out of 8 video streams are associated with the second escalator (i.e., escalator B). The method 200 according to the present disclosure may determine a second plurality of (4 in this example) video streams associated with a second escalator (escalator B in this example) among the plurality of (8 in this example) video streams. The method 200 according to the present disclosure may determine positions of a second plurality of video capture devices associated with the second plurality of (4 in this example) video streams over a second escalator (escalator B in this example), which are the lower middle portion, the lower landing, the upper landing, and the upper middle portion respectively in this example. The method 200 according to the present disclosure may determine a second display order based on a high-to-low order of positions of the second plurality of video capture devices over the second escalator, and display the second plurality of (4 in this example) video streams in the second plurality of (4 in this example) display windows according to the second display order, as shown in the second row at the lower part of FIG. 4. As can be seen, the four video streams shown in the second row in the lower part of FIG. 4 correspond respectively to the four video streams associated with the second escalator (escalator B in this example) shown in FIG. 3. However, in contrast to the random and unordered video stream shown in FIG. 3, the video streams shown in FIG. 4 are coherent and ordered, and are associated with an escalator.

Furthermore, it can also be seen from FIG. 4 that the two sets of video streams associated with the first escalator and the second escalator respectively are displayed in groups, i.e. the video streams of the first row in the upper part of FIG. 4 are associated with the first escalator and the video streams of the second row in the lower part of FIG. 4 are associated with the second escalator. This way of displaying may make it easier for the user to identify the relationship between the video streams and the escalators as compared to the way in which no distinction is made in FIG. 3, which may help the user or service personnel improve the efficiency of monitoring.

In one embodiment, the first plurality of display windows and/or the second plurality of display windows described above may be included in a user interface of a Web browser, thereby facilitating the user to browse video streams through the form of a Web page.

In one embodiment, in order to make the above-described display in groups more apparent to a user, the first plurality of display windows and the second plurality of display windows may be identified differently. The first plurality of display windows and the second plurality of display windows may be identified differently in a variety of ways. For example, the first plurality of display windows and the second plurality of display windows may be identified differently with different borders, backgrounds, colors, text, and the like. In one embodiment, identifying the first plurality of display windows and the second plurality of display windows differently may include identifying the first plurality of display windows and the second plurality of display windows with colored backgrounds, so that backgrounds of the first plurality of display windows and the second plurality of display windows have different colors. For example, in the example of FIG. 4, the first plurality of display windows may be identified with a red background and the second plurality of display windows may be identified with a green background, thereby making the first plurality of display windows and the second plurality of display windows easier to distinguish.

Figure 5:
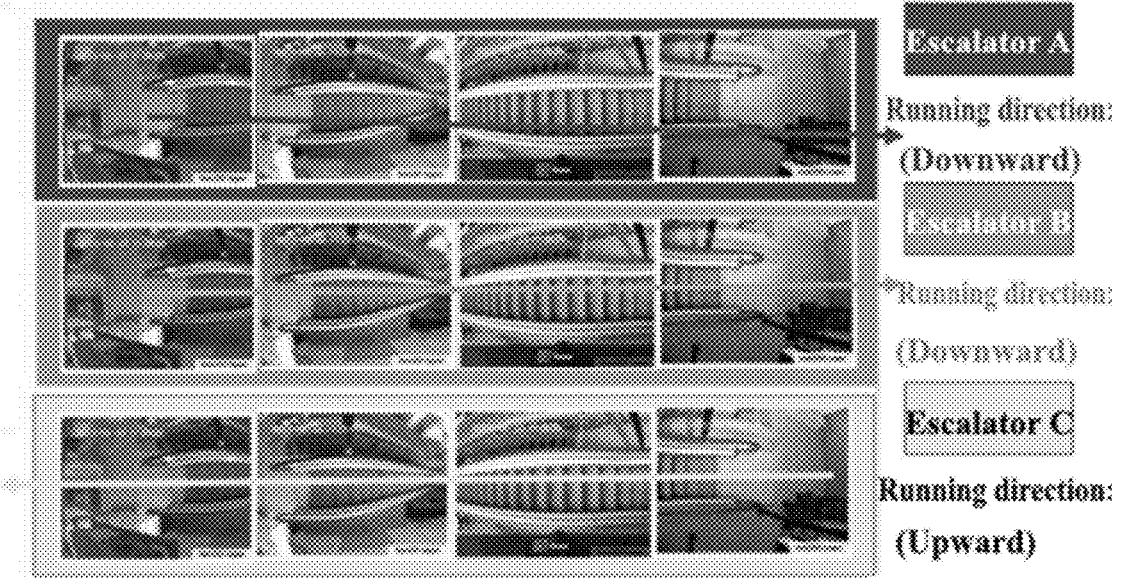
FIG. 5 schematically illustrates the display of video streams in display windows according to an embodiment of the present disclosure.

It can be appreciated that while described herein with respect to processing and displaying of video streams associated with a first escalator and a second escalator, the technical solutions of the present disclosure are applicable to processing and displaying of video streams associated with more escalators. FIG. 5 schematically illustrates the display of video streams in display windows according to an embodiment of the present disclosure, in which the coherent and ordered display of video streams associated with three escalators is shown, and the display of video streams in groups and the association of each group of video streams with an escalator are clearly shown.

In addition to identifying the display windows according to the association of the video streams with the escalators, it is also contemplated that the display windows may be identified according to the running direction of the escalators, thereby facilitating the user or service personnel to quickly identify the associated video streams of one or more escalators in a certain running direction. In one embodiment, display windows for video streams associated with escalators having the same running direction may be identified in the same way, and display windows for video streams associated with escalators having different running directions may be identified in different ways. Specifically, in the example of the first plurality of display windows and the second plurality of display windows described above, running directions of the first escalator and the second escalator may be determined first. The first plurality of display windows and the second plurality of display windows may be identified in the same way in response to the running directions of the first escalator and the second escalator being the same. The first plurality of display windows and the second plurality of display windows may be identified in different ways in response to the running direction of the first escalator and the second escalator being different.

The first plurality of display windows and the second plurality of display windows may be identified in the same way or different ways by way of border, background, color, text, or the like. In one embodiment, identifying the first plurality of display windows and the second plurality of display windows in different ways may include identifying the first plurality of display windows and the second plurality of display windows with colored backgrounds, so that backgrounds of the first plurality of display windows and the second plurality of display windows have different colors; while identifying the first plurality of display windows and the second plurality of display windows in the same way may include identifying the first plurality of display windows and the second plurality of display windows with the same colored background.

The display method of the video streams according to the embodiments of the present disclosure makes it possible to sequentially display the video streams in display windows according to a correspondence between the video streams and escalators, thereby facilitating the user to identify which video stream corresponds to which escalator and which video streams correspond to the same escalator, improving the efficiency of monitoring of conditions on the escalators, and in turn helping service personnel to react quickly when an unexpected condition occurs.

Figure 6:
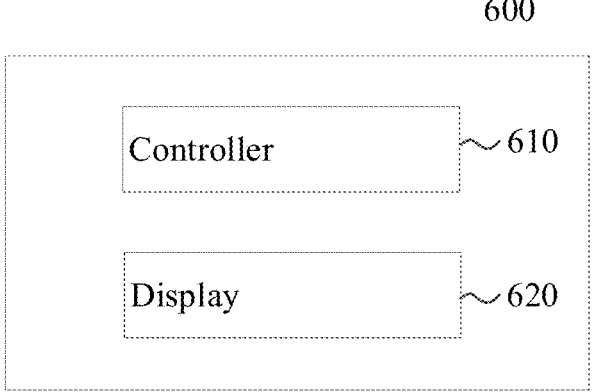
FIG. 6 is a schematic block diagram of a display system of video streams according to an embodiment of the present disclosure.

FIG. 6 is a schematic block diagram of a display system 600 of video streams according to an embodiment of the present disclosure. The display system 600 may be used to implement the above-described display method of video streams described with reference to FIGS. 1-5. As shown in FIG. 6, the system 600 may include a controller 610 and a display 620. The controller 610 may include common units with information processing, calculation, program running and other capabilities, such as a processor, a microprocessor, a central processing unit, a server, or the like. The controller 610 may be configured to perform steps S210 to S250 described above with reference to FIGS. 1-5, as well as other steps not shown. Specifically, the controller 610 may be configured to: obtain a plurality of video streams associated with a plurality of video capture devices; determine a first plurality of video streams associated with a first escalator among the plurality of video streams; determine positions of a first plurality of video capture devices associated with the first plurality of video streams among the plurality of video capture devices over the first escalator; determine a first display order of the first plurality of video streams in a first plurality of display windows based on the determined positions of the first plurality of video capture devices over the first escalator; and control the display 620 to display the first plurality of video streams in the first plurality of display windows according to the first display order.

In one embodiment, determining the first display order of the first plurality of video streams in the first plurality of display windows based on the determined positions of the first plurality of video capture devices over the first escalator may include, determining the first display order based on a low-to-high position order or a high-to-low position order of the first plurality of video capture devices over the first escalator.

In one embodiment, the controller 610 may be further configured to determine a running direction of the first escalator. The controller 610 controlling the display 620 to display the first plurality of video streams in the first plurality of display windows according to the first display order may include, identifying the running direction of the first escalator in the first plurality of display windows.

In an embodiment, the controller 610 may be further configured to: determine a second plurality of video streams associated with a second escalator among the plurality of video streams; determine positions of a second plurality of video capture devices associated with the second plurality of video streams among the plurality of video capture devices over the second escalator; determine a second display order of the second plurality of video streams in a second plurality of display windows based on the determined positions of the second plurality of video capture devices over the second escalator; and control the display 620 to display the second plurality of video streams in the second plurality of display windows according to the second display order.

In one embodiment, the first plurality of display windows and the second plurality of display windows may be identified in different ways.

In one embodiment, the controller 610 may be further configured to determine running directions of the first escalator and the second escalator. The first plurality of display windows and the second plurality of display windows may be identified in the same way in response to the running directions of the first escalator and the second escalator being the same. The first plurality of display windows and the second plurality of display windows may be identified in different ways in response to the running direction of the first escalator and the second escalator being different.

In one embodiment, the first plurality of display windows and the second plurality of display windows being identified in different ways may include, identifying the first plurality of display windows and the second plurality of display windows with colored backgrounds, so that backgrounds of the first plurality of display windows and the second plurality of display windows have different colors. The first plurality of display windows and the second plurality of display windows being identified in the same way may include identifying the first plurality of display windows and the second plurality of display windows with the same colored background.

In one embodiment, the first plurality of display windows and/or the second plurality of display windows may be included in a user interface of a Web browser.

In one embodiment, determining the first plurality of video streams associated with the first escalator among the plurality of video streams may include, determining the first plurality of video streams associated with the first escalator based on an association between the first plurality of video capture devices associated with the first plurality of video streams and the first escalator.

The display system of video streams according to the embodiments of the present disclosure makes it possible to sequentially display the video streams in display windows according to a correspondence between the video streams and escalators, thereby facilitating the user to identify which video stream corresponds to which escalator and which video streams correspond to the same escalator, improving the efficiency of monitoring of conditions on the escalators, and in turn helping service personnel to react quickly when an unexpected condition occurs.

The entirety of the hardware computing devices described in this disclosure or components thereof may be implemented by various suitable hardware means, including but not limited to an FPGA, an ASIC, an SoC, discrete gate or transistor logic, discrete hardware components, or any combination therebetween. The apparatuses, devices, methods, systems referred to in this disclosure are not limited to any particular hardware architecture or configuration. Components in the disclosed apparatuses, devices, systems may be separate or integrated, may be combined in different ways and/or replaced or supplemented by other components. It is to be understood that the teachings of the present disclosure may be implemented in various forms of hardware, software, firmware, special purpose processors, or combinations thereof.

The block diagrams of apparatuses, devices, methods, systems referred to in the present disclosure are merely exemplary and are not intended to require or imply that the connections, arrangements, configurations must be made in the manner shown in the block diagrams. As will be appreciated by those skilled in the art, these circuits, devices, apparatuses, devices, systems may be connected, arranged, configured in any way as long as the desired purpose is achieved.

It should be understood by those skilled in the art that the above-described specific embodiments are only examples but not limitations, and various modifications, combinations, partial combinations and substitutions may be made to the embodiments of the present disclosure according to design requirements and other factors as long as they are within the scope of the appended claims or the equivalent thereof, i.e., the scope to be protected by the present disclosure.

The invention claimed is:

1. A display method of video streams, comprising:
obtaining a plurality of video streams associated with a plurality of video capture devices;
determining a first plurality of video streams associated with a first escalator among the plurality of video streams;
determining positions of a first plurality of video capture devices associated with the first plurality of video streams among the plurality of video capture devices over the first escalator;
determining a first display order of the first plurality of video streams in a first plurality of display windows based on the determined positions of the first plurality of video capture devices over the first escalator; and
displaying the first plurality of video streams in the first plurality of display windows according to the first display order,
wherein determining the first display order of the first plurality of video streams in the first plurality of display windows based on the determined positions of the first plurality of video capture devices over the first escalator includes determining the first display order based on a low-to-high position order or a high-to-low position order of the first plurality of video capture devices over the first escalator.

2. The display method of claim 1, further comprising determining a running direction of the first escalator,
wherein displaying the first plurality of video streams in the first plurality of display windows according to the first display order comprises:
identifying the running direction in the first plurality of display windows.

3. The display method of claim 1, further comprising:
determining a second plurality of video streams associated with a second escalator among the plurality of video streams;
determining positions of a second plurality of video capture devices associated with the second plurality of video streams among the plurality of video capture devices over the second escalator;

determining a second display order of the second plurality of video streams in a second plurality of display windows based on the determined positions of the second plurality of video capture devices over the second escalator; and displaying the second plurality of video streams in the second plurality of display windows according to the second display order.

4. The display method of claim 3, wherein the first plurality of display windows and the second plurality of display windows are identified in different ways.

5. The display method of claim 4, wherein the first plurality of display windows and the second plurality of display windows being identified in different ways comprises:

identifying the first plurality of display windows and the second plurality of display windows with colored backgrounds, so that backgrounds of the first plurality of display windows and the second plurality of display windows have different colors; and wherein the first plurality of display windows and the second plurality of display windows being identified in the same way comprises:

identifying the first plurality of display windows and the second plurality of display windows with a same colored background.

6. The display method of claim 3, further comprising:

determining running directions of the first escalator and the second escalator, wherein the first plurality of display windows and the second plurality of display windows are identified in a same way in response to the running directions of the first escalator and the second escalator being the same; and wherein the first plurality of display windows and the second plurality of display windows are identified in different ways in response to the running directions of the first escalator and the second escalator being different.

7. The display method of claim 6, wherein the first plurality of display windows and the second plurality of display windows being identified in different ways comprises:

identifying the first plurality of display windows and the second plurality of display windows with colored backgrounds, so that backgrounds of the first plurality of display windows and the second plurality of display windows have different colors; and wherein the first plurality of display windows and the second plurality of display windows being identified in the same way comprises:

identifying the first plurality of display windows and the second plurality of display windows with a same colored background.

8. The display method of claim 3, wherein the first plurality of display windows and/or the second plurality of display windows are included in a user interface of a Web browser.

9. The display method of claim 1, wherein determining the first plurality of video streams associated with the first escalator among the plurality of video streams comprises:

determining the first plurality of video streams associated with the first escalator based on an association between the first plurality of video capture devices associated with the first plurality of video streams and the first escalator.

10. The display method of claim 1, wherein each video stream among the plurality of video streams including an embedded tag indicating with which video capture device among the plurality of video capture devices the video stream is associated, and the determining the first plurality of video streams associated with the first escalator among the plurality of video streams is based on the embedded tag in each of the plurality of video streams.

11. A display system of video streams, comprising:

a controller and a display, wherein the controller is configured to:

obtain a plurality of video streams associated with a plurality of video capture devices;

determine a first plurality of video streams associated with a first escalator among the plurality of video streams;

determine positions of a first plurality of video capture devices associated with the first plurality of video streams among the plurality of video capture devices over the first escalator;

determine a first display order of the first plurality of video streams in a first plurality of display windows based on the determined positions of the first plurality of video capture devices over the first escalator; and control the display to display the first plurality of video streams in the first plurality of display windows according to the first display order, wherein determining the first display order of the first plurality of video streams in the first plurality of display windows based on the determined positions of the first plurality of video capture devices over the first escalator includes determining the first display order based on a low-to-high position order or a high-to-low position order of the first plurality of video capture devices over the first escalator.

12. The display system of claim 11, wherein the controller is further configured to:

determine a running direction of the first escalator, wherein controlling the display to display the first plurality of video streams in the first plurality of display windows according to the first display order comprises: identifying the running direction in the first plurality of display windows.

13. The display system of claim 11, wherein the controller is further configured to:

determine a second plurality of video streams associated with a second escalator among the plurality of video streams;

determine positions of a second plurality of video capture devices associated with the second plurality of video streams among the plurality of video capture devices over the second escalator;

determine a second display order of the second plurality of video streams in a second plurality of display windows based on the determined positions of the second plurality of video capture devices over the second escalator; and control the display to display the second plurality of video streams in the second plurality of display windows according to the second display order.

14. The display system of claim 13, wherein the first plurality of display windows and the second plurality of display windows are identified in different ways.

15. The display system of claim 14, wherein the first plurality of display windows and the second plurality of display windows being identified in different ways comprises:

identifying the first plurality of display windows and the second plurality of display windows with colored backgrounds, so that backgrounds of the first plurality of display windows and the second plurality of display windows have different colors; and wherein the first plurality of display windows and the second plurality of display windows being identified in the same way comprises:

identifying the first plurality of display windows and the second plurality of display windows with a same colored background.

16. The display system of claim 13, wherein the controller is further configured to:

determine running directions of the first escalator and the second escalator, wherein the first plurality of display windows and the second plurality of display windows are identified in a same way in response to the running directions of the first escalator and the second escalator being the same; and wherein the first plurality of display windows and the second plurality of display windows are identified in different ways in response to the running directions of the first escalator and the second escalator being different.

17. The display system of claim 16, wherein the first plurality of display windows and the second plurality of display windows being identified in different ways comprises:

identifying the first plurality of display windows and the second plurality of display windows with colored backgrounds, so that backgrounds of the first plurality of display windows and the second plurality of display windows have different colors; and wherein the first plurality of display windows and the second plurality of display windows being identified in the same way comprises:

identifying the first plurality of display windows and the second plurality of display windows with a same colored background.

18. The display system of claim 13, wherein the first plurality of display windows and/or the second plurality of display windows are included in a user interface of a Web browser.

19. The display system of claim 11, wherein determining the first plurality of video streams associated with the first escalator among the plurality of video streams comprises:

determining the first plurality of video streams associated with the first escalator based on an association between the first plurality of video capture devices associated with the first plurality of video streams and the first escalator.

20. The display system of claim 11, wherein each video stream among the plurality of video streams including an embedded tag indicating with which video capture device among the plurality of video capture devices the video stream is associated, and the determining the first plurality of video streams associated with the first escalator among the plurality of video streams is based on the embedded tag in each of the plurality of video streams.

\* \* \* \* \*